(12) United States Patent
Falconieri et al.

(10) Patent No.: US 8,894,720 B2
(45) Date of Patent: Nov. 25, 2014

(54) PROCEDURE FOR THE PREPARATION OF SULPHUR-BASED ARTICLES OF MANUFACTURE

(75) Inventors: Antonio Salvatore Falconieri, Vimercate (IT); Franco Finocchiaro, Milan (IT); Claudio Paolo Cecchini, Milan (IT)

(73) Assignees: Ausy S.r.l., Sannazzaro de'Burgondi (IT); Antonio Salvatore Falconieri, Vimercate (IT)

( * ) Notice: Subject to any disclaimer, the term of this patent is extended or adjusted under 35 U.S.C. 154(b) by 0 days.

(21) Appl. No.: 14/110,814

(22) PCT Filed: Apr. 18, 2012

(86) PCT No.: PCT/EP2012/057071
§ 371 (c)(1),
(2), (4) Date: Dec. 4, 2013

(87) PCT Pub. No.: WO2012/143388
PCT Pub. Date: Oct. 26, 2012

(65) Prior Publication Data
US 2014/0308198 A1 Oct. 16, 2014

(30) Foreign Application Priority Data

Apr. 19, 2011 (IT) .................................. MI11A0668

(51) Int. Cl.
*B01J 6/00* (2006.01)
*C01B 17/00* (2006.01)
*C01B 17/02* (2006.01)

(52) U.S. Cl.
CPC ............. *C01B 17/0216* (2013.01); *C01B 17/00* (2013.01)
USPC ........ 23/293 S; 23/295 R; 588/251; 588/409; 588/414

(58) Field of Classification Search
USPC .............. 23/293 S, 295 R; 588/251, 409, 414
See application file for complete search history.

(56) References Cited

FOREIGN PATENT DOCUMENTS

| EP | 1886781 | 2/2008 |
|---|---|---|
| EP | 2258669 | 12/2010 |
| GB | 1536693 | 12/1978 |
| JP | 11347514 | 12/1999 |
| JP | 2006095847 | 4/2006 |

OTHER PUBLICATIONS

International Search Report issued in counterpart PCT Application No. PCT/EP2012/057071.
Written Opinion of International Searching Authority issued in counterpart PCT Application No. PCT/EP2012/057071.

*Primary Examiner* — Edward Johnson
(74) *Attorney, Agent, or Firm* — Silvia Salvadori, P.C.

(57) ABSTRACT

The present invention relates to a process for the preparation of articles of manufacture made of or based on sulphur, which comprises cooling of liquid sulphur in a volume of containment until the sulphur mass solidifies and forming of the product, characterized in that elastic pressure waves are applied to the cooling mass of liquid sulphur to produce a crystalline suspension of solid sulphur in liquid sulphur.

13 Claims, 5 Drawing Sheets

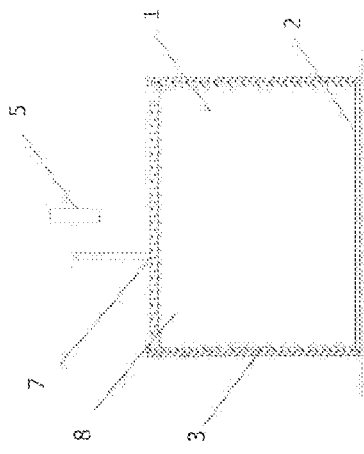
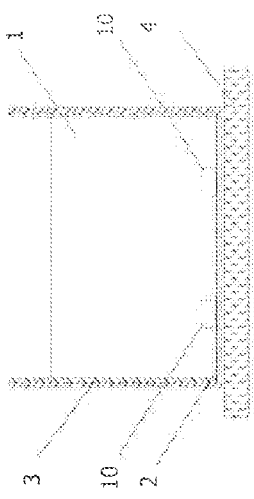
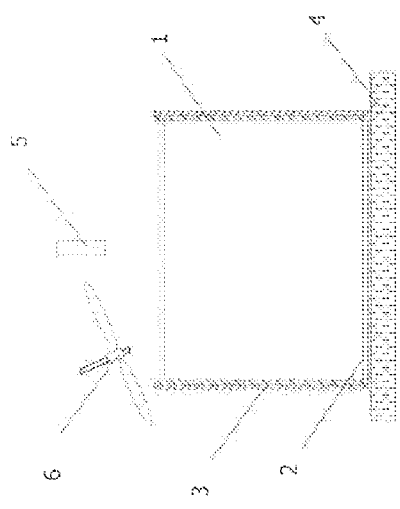
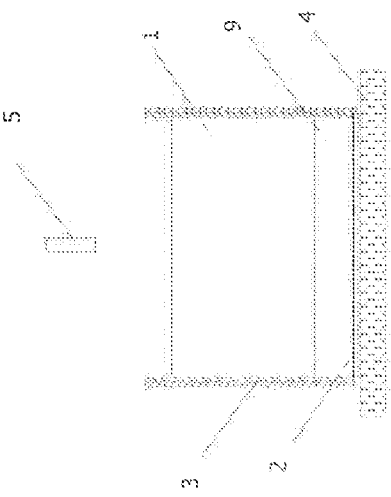

PROCEDURE FOR THE PREPARATION OF SULPHUR-BASED ARTICLES OF MANUFACTURE

This application is a U.S. national stage of PCT/EP2012/057071 filed on Apr. 18, 2012, which claims priority to and the benefit of Italian Application No. MI2011A000668 filed on Apr. 19, 2011, the contents of which are incorporated herein by reference in their entirety.

The present invention relates to a process for the preparation of articles of manufacture made of or based on sulphur, which comprises cooling of liquid sulphur in a volume of containment until the sulphur mass solidifies and forming of the product, characterised in that elastic pressure waves are applied to the cooling mass of liquid sulphur to produce a crystalline suspension of solid sulphur in liquid sulphur.

BACKGROUND TO THE INVENTION

It is common practice to desulphurise oil fractions with hydrotreatment units in refineries and with suitable technologies at acid natural gas extraction sites, thus producing large amounts of sulphur as a by-product, which is stored in liquid form in tanks or solidified in large blocks, pastillated or formed by a wet process into small flakes or pellets to promote heat dispersion in the solidification process and facilitate handling and transport. In this way, huge masses can accumulate at production sites, with a length and width of dozens/hundreds of meters, and heights of 10 meters or more, which involve onerous storage/destorage operations. Depending on market requirements, efficient, economical solidification, storage and destorage techniques may be required. As sulphur possesses limited heat conductivity, in industrial practice large blocks of sulphur are obtained by feeding and layering in successive thin layers juxtaposed with thicknesses not exceeding approx. 10 cm, and preferably not exceeding 5 cm, thus guaranteeing an adequate cooling time for the molten mass, in order to give it the necessary characteristics of mechanical strength. Stratification allows effective dispersion of heat from the surface exposed to air by natural convection. In the absence of said procedure, the poured material, once cooled, forms a fragile, uneven material, characterised by the presence of cavities, possibly containing liquid sulphur, which may cause injury or damage to personnel or machinery during the processing/handling stages. Solidification of the stratified sulphur requires large areas and long solidification times. To eliminate these drawbacks, techniques are employed that form the sulphur into flakes, pellets or pastilles using coolants (generally water), which are characterised by a better heat transport coefficient than air and come into direct/indirect contact with the sulphur. These methods guarantee high productivity but are complicated and onerous, involving the use of complex equipment (grilling towers, drop-forming machines and pastillators with rotary forming rollers), considerable quantities of cooling water and a large amount of skilled labour. Sulphur has been and still is one of the most widely studied elements because of its polymorphic characteristics and special features. Orthorhombic sulphur (the form which is stable under ambient conditions) was one of the first crystalline structures to be characterised by X-rays; since then, over 50 allotropic forms of sulphur have been described, comprising structures mainly based on cyclical molecules or polymer chains. The orthorhombic structure, more commonly known as alpha-sulphur, has a characteristic pale yellow colour, is opaque and fragile, and is stable under approx. 95° C. (369° K). At higher temperatures, alpha-sulphur is transformed into the monoclinic allotrope beta-sulphur, which is stable up to melting point, at approx. 115° C. (388° K). The crystals are needle-shaped, waxy and fragile, and have an orange-yellow colour with pearly reflexes. The transformation between the two forms is reversible. Both orthorhombic alpha-sulphur and monoclinic beta-sulphur are based on molecular unit $S_8$. The density of the two allotropes is 2.066 g/cm3 for alpha-sulphur and 2.008 g/cm3 for beta-sulphur. In the amorphous form, obtained by rapid cooling of molten sulphur, there are no crystals; in this state sulphur is hard, dark brown and elastic and is unstable, slowly transforming to crystalline rhombic sulphur; X-ray crystallography shows that this amorphous form may have a helical shape with 8 atoms. Liquid sulphur is characterised by unique physical properties; at all temperatures it contains rings having from 6 to at least 35 atoms, with $S_8$ constituting the majority of the species together with polymeric sulphur $S_1$, which only becomes the majority at temperatures exceeding 170° C. (443° K). Liquid sulphur is characterised by a honey-yellow colour near melting point; said colour changes reversibly, as the temperature increases, to bright yellow, then orange, then dark red, and finally red-brown close to boiling point at 445° C. (718° K). The density of liquid sulphur (at ambient pressure) declines as the temperature increases from 1,802 g/cm3 at 120° C. (393° K) to 1.573 g/cm3 at 440° C. (713° K). Sulphur has excellent heat insulating properties; its thermal conductivity declines as the temperature increases. For temperatures below 95.4° C. (368° K), the conductivity of alpha-sulphur can be approximately expressed by the law $k=0.8935-3.3347 \times T/10^3 + 4.1524 \times T^2/10^6$ (W/mK), where parameter T temperature is expressed in degrees Kelvin, ie. approx. 0.266 W/mK at approx. 27° C. (300° K), while as soon as the temperature of transition to monoclinic sulphur is exceeded, the thermal conductivity of beta-sulphur falls to approx. 0.156 W/mK. The dynamic viscosity of the molten sulphur has a minimum value of 0.007 s Pa (0.07 Poise) at approx. 157° C. (430° K), but increases by over four orders of magnitude in the low temperature range of 155-190° C. (428-463° K), reaching the maximum viscosity of 93.2 sPa at approx. 187° C. (460° K), after which the viscosity again falls to 0.1 sPa at boiling point. FIG. 1 shows the simplified phase diagram for sulphur, illustrating the solidification process at 1 atmosphere when sulphur passes from the liquid state (A) to the monoclinic beta solid state (B) to the orthorhombic alpha solid state (C). Said transformation involves a reduction in volume, which can induce a state of tension in the solidified sulphur, leading to rupture and disintegration following heat cycles or other instabilities. To solve said problem, Ducker chemically modified sulphur by adding olefins to delay its tendency to reduce in density, and to improve its mechanical characteristics. In the subsequent years, with a view to obtaining materials for industry based on sulphur and sulphur cements, the use of additives designed to chemically modify the properties of sulphur was consolidated, one example being plasticising polymers designed to induce the formation of polysulphides and alter the crystallisation of sulphur. As an alternative to the chemical approach, a solely physical approach to the problem has also been employed, using aggregates and fillers with suitable particular-size distributions as additives to control crystallisation and reduce the tensions in the solidified sulphur. Said additives with physical interaction produce a dense network of nucleation points in the molten sulphur where the crystals can grow in an orderly way, thus obtaining a compact structure with small crystals. Said methods are effective, but involve the use of large quantities of organic and/or inorganic additives, and do not produce crystalline structures of orthorhombic alpha-sulphur with high purity.

STATE OF THE ART

GB1536693A describes a method for the production of pellets from droplets of molten sulphur. The solidifying drops of sulphur are immersed in a coolant, forming pellets from an inclined ramp immersed in the same coolant and/or subjecting the pellets under formation to acoustic, sonic or preferably ultrasonic pressure waves applied to the ramp via transducers or vibrators. The pressure waves prevent mutual adherence between one pellet and another and between the pellets and the ramp. The inclined ramp increases the residence time of the solidifying pellets in the coolant, thus contributing to their consolidation, due to the modification of the inner cavity, which is transformed to a more centred, circular shape that is mechanically stronger. The invention only operates with tiny drops, requires large quantities of coolant and skilled operators, and is limited by the need to handle large quantities of molten material when solidification has been completed.

U.S. Pat. No. 4,981,740 describes a method of preparing sulphur concrete pipes similar to the vibration-assisted dry preparation of concrete pipes using a composition similar to concrete wherein the binder and water are replaced by a substantially equal volume of molten cement and sulphur. The mixture is poured into a pipe mould subject to vibrations, and preheated to approx. 160° C.; the article of manufacture is then separated from the mould. The vibrations compact the agglomerate particles, thus coating the particles with a thin layer of sulphur cement and filling the mould evenly. The pipe produced is uncollapsible when the mould is opened after feeding, thus obtaining, after curing outside the mould, articles which have better mechanical characteristics than those based on cement, and are resistant to acid corrosion.

DESCRIPTION OF THE INVENTION

A process of sulphur solidification and consolidation using elastic waves has now surprisingly been found, which is applicable to articles of various shapes and sizes. The process according to the invention uses elastic waves propagated in liquid sulphur to induce a metastable state during the solidification and cooling stage, which said state is characterised by the simultaneous presence of a dispersed crystalline solid phase, due to the stirring produced by the vibrations in the liquid phase. Surprisingly, the vibrations induced during the cooling process in the liquid sulphur inside the volume of containment induce the transport of crystallisation germs from the peripheral areas with lower temperatures to the central areas of said container, thus creating an evenly distributed nucleation network in the liquid sulphur that promotes the growth of orderly crystalline structures, without the use of additives inducing chemical and/or physical interactions with the sulphur. During vibration-assisted cooling and solidification, the liquid phase is gradually enriched with crystalline sulphur in suspension, acquiring an increasingly paste-like, granular texture due to the progressive release of heat and the flow field induced. The increase in the average density of the sulphur is gradual, thus limiting/eliminating areas of unevenness and tensions in the article of manufacture. It is consequently possible to obtain, according to the present invention, articles wherein the formation of irregular, friable interiors characterised by macrocrystals and/or cavities with significant, randomised dimensions is inhibited/limited, thus producing articles with controlled mechanical characteristics and high density, due to the reduction/elimination of internal tensions and to the type of crystals obtained during the solidification process. FIG. 2 shows the X-ray diffractogram of a ground specimen obtained from a sulphur block according to an application method used in the present invention, highlighting the crystalline structure consisting of orthorhombic (alpha) crystals present in the article. The controlled application of elastic waves helps to ensure better heat dispersion, as the flows induced by the elastic pressure waves in the liquid sulphur at the cooling and/or solidification stage improve the coefficient of heat exchange with the external environment and accelerate the solidification process.

In particular the present invention claims a process for the preparation of articles of manufacture made of or based on sulphur and/or coated with sulphur, which comprises cooling of a mass of liquid sulphur in a volume of containment and/or forming volume of containment and is characterised in that elastic pressure waves are applied to the cooling mass of liquid sulphur in said volume of containment and/or forming container in order to obtain the mixing, solidification and formation of a suspension of solid crystalline sulphur in said mass of liquid sulphur for the purpose of preparing said articles of manufacture. "Forming" means giving the sulphur-based article the desired morphological and geometrical characteristics, by means of areas demarcating a volume of containment and/or through-holes/apertures, for example, or by stratification on suitable surfaces.

Said application of elastic waves to sulphur can be performed, for example, by means of vibrodynes, namely motor vibrators which may be mechanical (only able to produce sinusoidal actions), pneumatic, hydraulic or electrical (electrohydraulic/electrodynamic), either wall-mounted or on vibrating bases, or by means of fluid-immersion vibrators, ultrasonic transducers or any device or methodology or combination of known techniques. The frequency of application of the elastic perturbation waves applicable in the present invention is higher than 0.1 Hz, and comprises the infrasonic and sonic fields, with frequencies preferably equal to or higher than 50 Hz, and the ultrasonic field (higher than 20 kHz). Depending on the type of vibration generator used, elastic perturbation waves can be applied in continuous, pulsating and/or variable-frequency, multifrequency or sweeping mode, modulating the frequency of the signal produced around a central frequency. Elastic waves, especially ultrasound waves, can be used to consolidate the article and/or to inspect the density/thickness of the sulphur-based articles. The process of obtaining the phase containing solidified sulphur in suspension can be performed at atmospheric pressure or at different pressures, while solidification of the article and cooling to ambient temperature can be completed outside the volume of containment and/or forming container, preferably in a secondary volume of containment and/or forming container or in contact with a surface to be covered. The heat exchange towards the external environment can be performed by irradiation, natural or forced convection, conduction, and in the presence of cooling fluids. If one or more heat exchangers are used, they may be floating and/or vibrating on the surface of the molten sulphur/sulphur in suspension, and may also be fitted with hoses to feed the coolant. The process according to the present invention is designed for the preparation of articles based on sulphur, and comprises the application of elastic pressure waves in the liquid sulphur, and preferably the controlled feed thereof, and forming and consolidation of the formed, cooled sulphur. The present invention will be usefully employed in the manufacture of sulphur blocks designed for handling and transport due to the control of the mechanical characteristics of the block, and in the manufacture of articles made of or based on sulphur intended for a wide variety of agricultural or industrial uses, such as the production of sulphur bentonite articles. Articles made of sulphur with controlled crystalline density/morphology can be usefully employed in the chemical industry due to the resistance of sulphur to acid corrosion. The production of articles made of or based on sulphur according to the present invention for use in the construction industry and other industries is particularly significant, due to the low heat exchange coefficient of sulphur. The present process also allows the addition of organic or inorganic components to said suspension of solid crystalline sulphur in liquid sulphur by means of elastic waves, to chemically and/or physically modify the crystalline morphology of said articles or alter their chemical/physical properties, through the use of chemical additives such as polymers, olefins, binders, plasticisers, stabilisers, flame retardants/inhibitors and the like, and/or additives with a physical interaction such as heterogeneous materials/fillers consisting of fibres, sand, pumice, clay, pigments, etc. Said additives are preferably pre-mixed in the liquid sulphur and subsequently fed into said suspension of solid crystalline sulphur in liquid sulphur subjected to vibrations. Said embodiment differs from the prior art in that said additives are not added until the crystallisation process has already begun, and preferably at an advanced stage, when the crystalline sulphur is in suspension in the liquid sulphur. Said operation is advantageous in terms of reducing the quantity of additive (s) to be used, and allows the characteristics of the article to be modulated according to the type of additives.

Articles manufactured by vibration-assisted solidification can also be reinforced with metal structures and/or reinforcements made of suitable material designed to give the desired mechanical characteristics, or can incorporate materials designed to modify their heat conductivity (such as expanded clay or polystyrene) or their chemical stability, or for other uses.

The application of elastic waves to liquid sulphur until the formation of a suspension of solid sulphur in liquid sulphur can be performed before or during the forming process, or at both stages. Moulds, formworks, calenders, extruders or other suitably adapted devices or containers can be used for forming. Forming can be performed directly in a transport container or in any volume of containment designed to contain the sulphur in suspension which prevents/limits the escape of sulphur. Stratification or coating of the sulphur in suspension on suitable surfaces can be performed by spreading, by one or more successive feeds/pourings or by immersion, or by other procedures. Said surfaces to be coated or said volume of containment or forming containers can consist wholly or partly of at least one of the following materials: metals, cellulose-based materials such as paper or cardboard, bitumens, resins, thermoplastic materials, thermosetting materials, elastomers, rubbers, heat-insulating materials, natural or artificial textiles, cement, concrete, metals, sulphur, sulphur cement and the like. The presence of sulphur crystals in suspension in liquid sulphur can be prolonged over time by heat input, temperature control and control of the flow field of the suspension. The articles made of or based on sulphur can be provided with grooves, cavities, through-holes or hooks, or positioned on pallets or the like for rapid handling. Said grooves or cavities can be obtained during forming by inserting shaped elements made of suitable material during the vibration-assisted feed process, or with the use of moulds. Alternatively, the handling elements such as hooks, cables and brackets can be positioned in the forming container in advance, and subsequently incorporated in the poured material and used when the article of manufacture has solidified. The production of cavities/through-holes in the sulphur-based article can also be designed to reduce the heat transmittance of the article, or for other purposes. Finally, if ultrasonic frequencies are used, the article can be assisted and controlled by detectors of the dynamic response of the elastic forces induced in order to monitor the structural characteristics of the article. It has also been observed that under particular conditions, the suspension with a high concentration of solid crystalline sulphur can retain its plasticity for a short time if handled by an operator without protection from heat, due to the formation of a thin film of intercrystalline liquid sulphur with low heat conductivity.

BRIEF DESCRIPTION OF DRAWINGS

Some embodiments of the present invention designed to illustrate further aspects, characteristics and advantages thereof are described in detail below, by reference to the annexed drawings, wherein:

FIG. 3: is a partial schematic view of a sulphur-based article 1 under controlled feed from a nozzle 5 into a container demarcated by surfaces 2 and 3 placed on a vibrating plate 4 designed to induce the formation of sulphur in suspension, coupled to a device that directly cools the sulphur surface using a fan 6.

FIG. 4: is a partial schematic view of a sulphur-based article under controlled feed from a nozzle 5 into a container demarcated by surfaces 2 and 3 and provided with an elastic-wave molten sulphur mixing device 7 between its outer surface and its layers, designed to induce the formation of solid sulphur in suspension in the surface layer of molten sulphur 8 in contact with the upper surface of the previously formed portion of article 1.

FIG. 5: is a partial schematic view of a sulphur article 1 poured from a nozzle 5 into a container demarcated by surfaces 2 and 3 placed on a vibrating plate 4. Said article is made in two successive stages, one before the feed of suitable material (such as sulphur cement, concrete, thermoplastic/thermosetting materials) designed to give the article the desired properties, and a second controlled feed of sulphur from the same nozzle (or from a second nozzle not shown). As an alternative to the system illustrated, the sulphur can be poured and vibrated on the (inner and/or outer) surface of an article made of a material suitable, for example, to give the article characteristics of resistance to acid attack.

FIG. 6: is a partial schematic view of a sulphur article 1 poured from a nozzle 5 into a container demarcated by surfaces 2 and 3 placed on a vibrating plate 4 designed to induce the formation of solid sulphur in suspension. Said article is provided with grooves 10 suitable for the positioning of a fork of a fork-lift truck for handling. Said grooves can be made in the block during the feed, for example, after positioning on the base thereof of elements made of cardboard, for example, which are designed to form an empty space in the block, or with a suitable mould.

Some examples of embodiments of the present innovation are supplied below, which should not be considered as a limitation thereon.

EXAMPLE 1

A 400 gram sample of sulphur is liquefied in a beaker at ambient pressure and heated to approx. 200° C. (473° K), producing a layer 50 mm thick. The sample is then cooled and solidified in air at ambient temperature. After 30 minutes the sample has solidified on the outer surface, but presents an internal liquid phase. At the end of cooling and solidification the sample thus obtained is fragile and uneven, characterised by macrovacuoles and the formation of micro- and macro-crystals.

EXAMPLE 2

Figure 1:
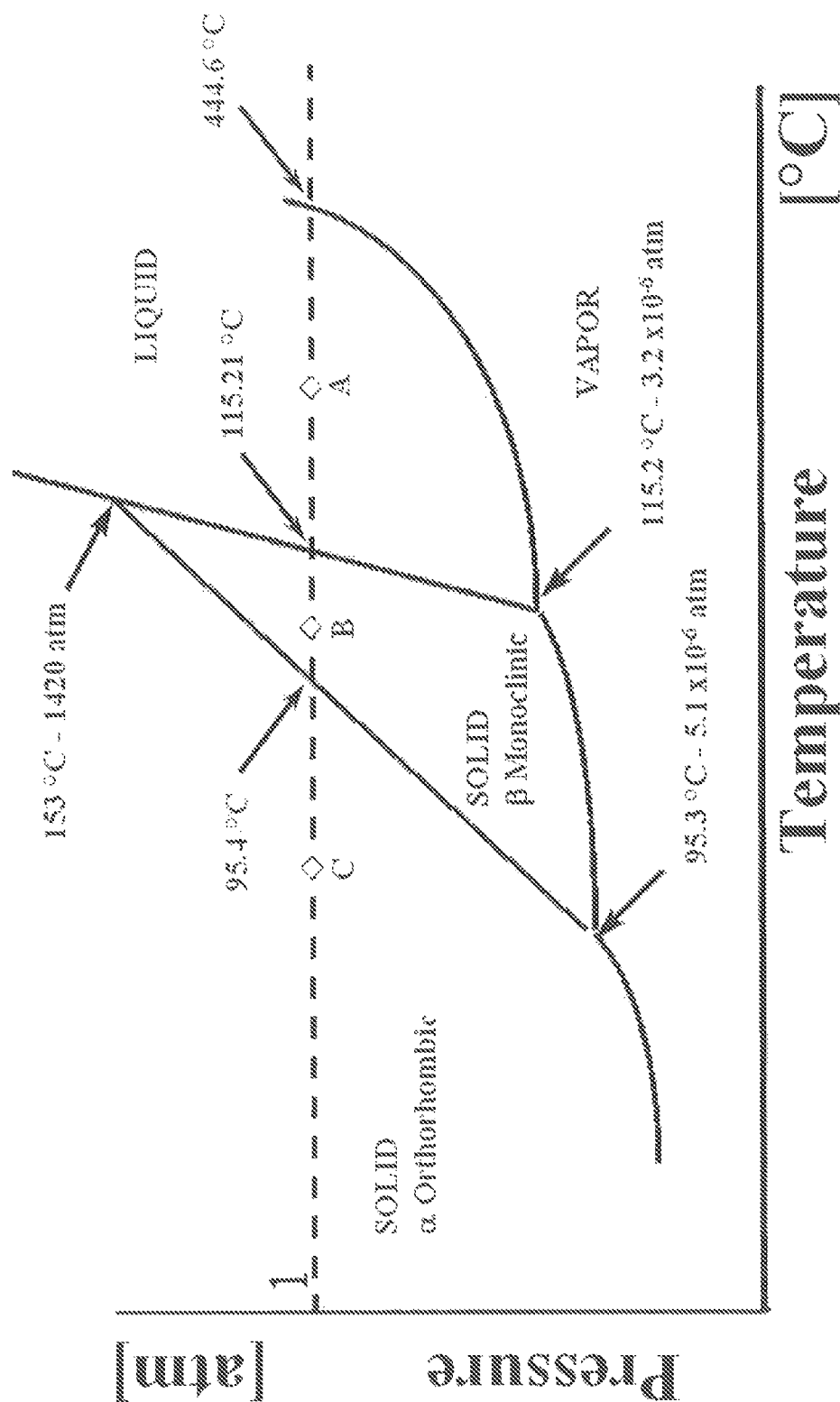
FIG. 1: shows the simplified phase diagram of sulphur, which illustrates the process of solidification at 1 atmosphere wherein sulphur passes from the liquid state (A) to the monoclinic beta solid state (B), and finally to the orthorhombic alpha solid state (C).
Figure 2:
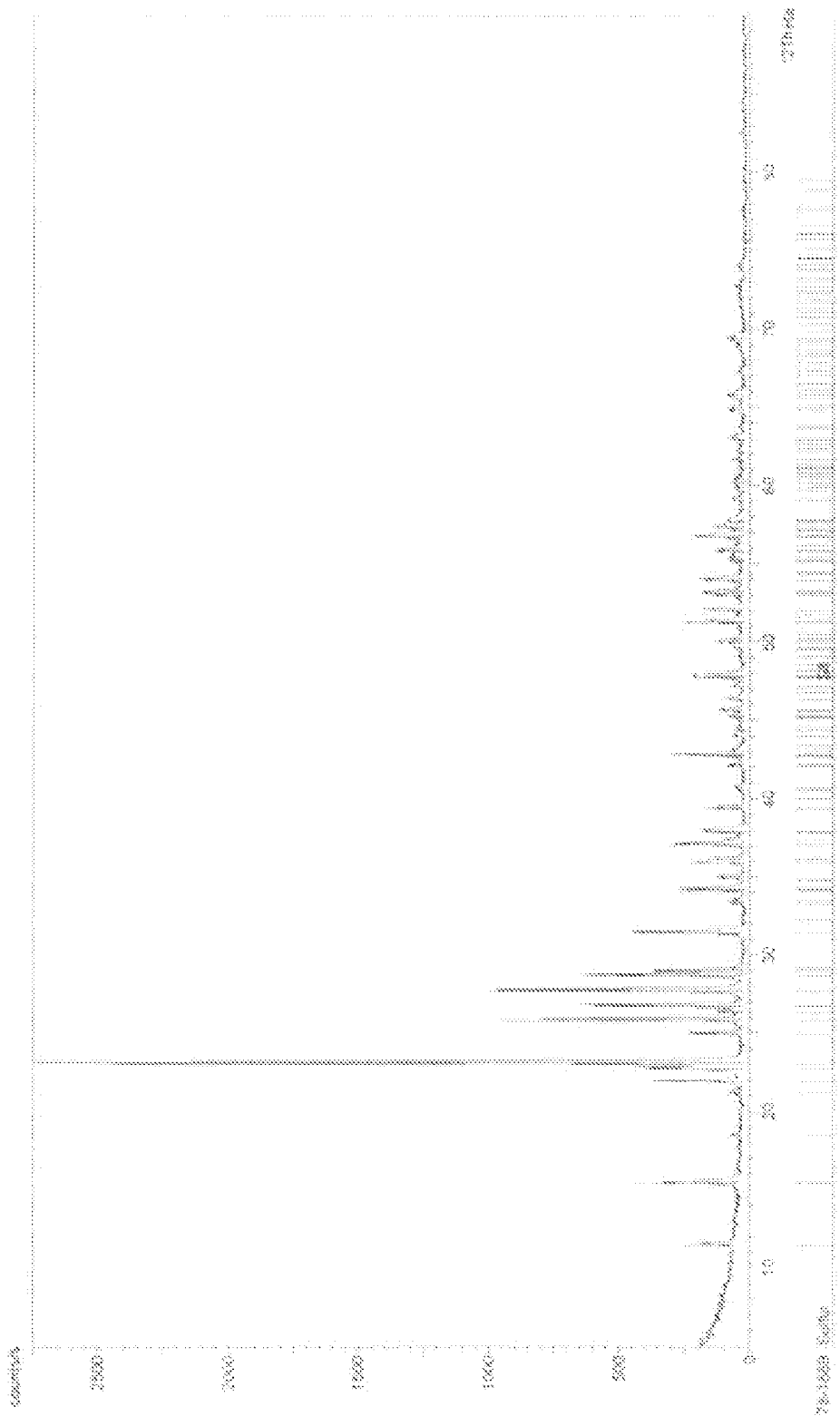
FIG. 2: X-ray diffractogram of a specimen obtained by grinding a sample of a sulphur article showing the formation of orthorhombic alpha-sulphur crystals.
Figure 7:
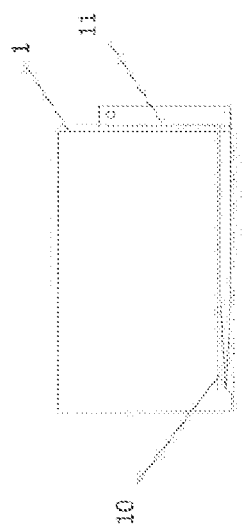
FIG. 7: the same sulphur article as shown in FIG. 3, at a stage after the formation of solid sulphur in suspension, wherein said solidified block is handled by the fork of a fork-lift truck 11 positioned in said grooves 10 present in the article.
Figure 8:
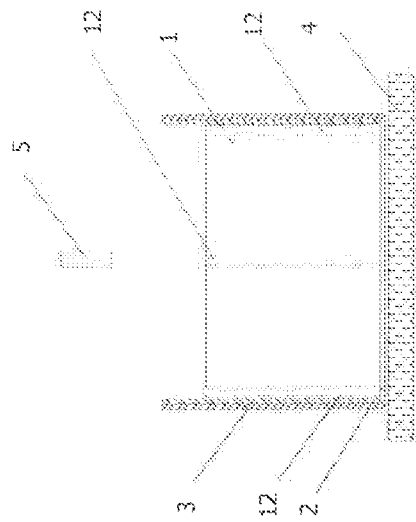
FIG. 8: is a partial schematic view of a sulphur article 1 poured from a nozzle 5 under controlled feed into a container demarcated by surfaces 2 and 3 placed on a vibrating plate 4 designed to induce the formation of solid sulphur in suspension, said article being provided with grooves 12 suitable for the positioning of handling cables/chains. Said grooves can be made in the block during the feed, after positioning on the base thereof of elements made of cardboard, for example, which are designed to form an empty space in the block, or with a suitable mould or formwork. Alternatively, said handling cables can be suitably incorporated in the article during the solidification and forming process.
Figure 9:
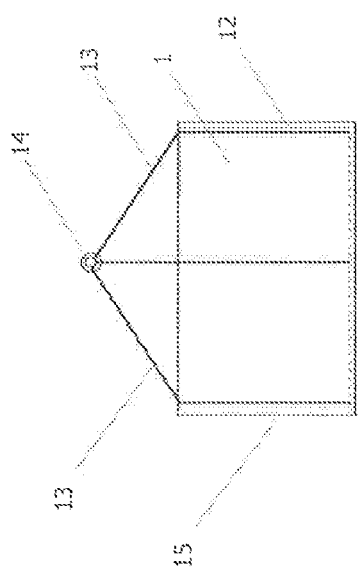
FIG. 9: the same sulphur article as shown in FIG. 8, at a later stage, wherein said article is handled with cables 13 (or chains or the like) passing through grooves 12 and using a lifting hook 14. The article can subsequently be wrapped in suitable material 15 to limit/eliminate the release of fines during transport.
Figure 10:
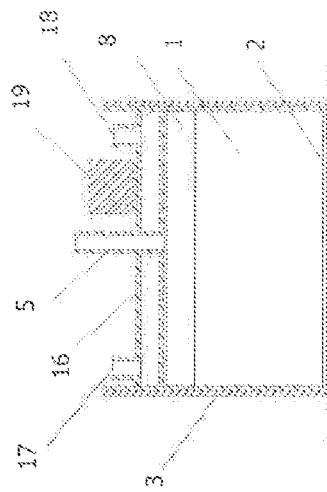
FIG. 10: is a partial schematic view of a sulphur-based article under controlled feed from a nozzle 5 into a container demarcated by surfaces 2 and 3. The feed nozzle is thermally insulated and passes through a vibrating heat exchanger 16 provided with inlets 17 and outlets 18 for the cooling fluid. The exchanger floats on the surface of molten sulphur 8 and the elastic forces are induced, for example, by a mechanically driven vibrodyne 19 operating at 100 Hz. The pressure waves transmitted from the surface of the exchanger in contact with the sulphur improve the heat exchange coefficient and induce the formation of sulphur solid in suspension in the surface layer of molten sulphur 8 in contact with the upper surface of the previously formed portion of article 1. As an alternative to the method illustrated, the exchanger could, for example, consist of a plate cooled with a suitable fluid which vibrates, driven by suitable electrodynamic actuators operating in the frequency range between 5 and 1000 Hz, which in turn are cooled by the same plate.
Figure 12:
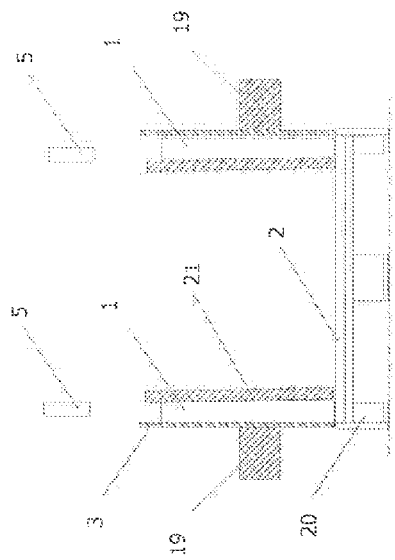
FIG. 12: is a partial schematic view of a sulphur-based article under controlled feed from a nozzle 5 into a container demarcated by surfaces 2, 3 and 21 and formed directly on a handling pallet 20. Surface 21 demarcates a pre-formed article made of suitable material (such as a tubular concrete element with a square cross-section). Surface 3 consists of 4 removable mobile containment and forming partitions provided with vibrodynes 19. When vibration-assisted forming has been completed and the mobile partitions removed, the article is sent for storage or loading for transport.
Figure 14:
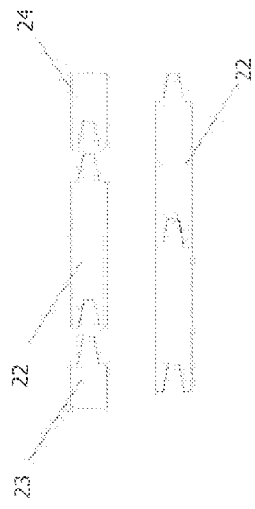
FIG. 14: is a partial schematic and illustrative view of mutually interlocking sulphur-based articles 22, 23 and 24, the interlocking system being obtainable with vibration-assisted formworks.
Figure 11:
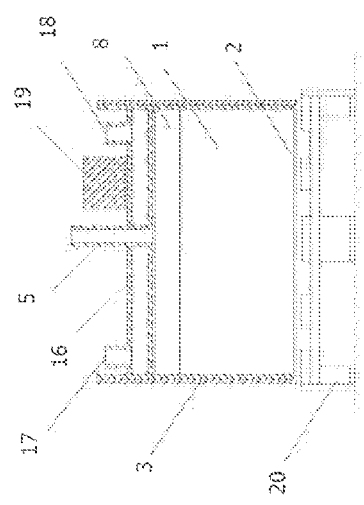
FIG. 11: is a partial schematic view of a sulphur-based article under controlled feed from a nozzle 5 into a container demarcated by surfaces 2 and 3 and obtained as shown in FIG. 12 directly on a handling pallet 20. At the end of forming and solidification the mobile containment and forming partitions are removed, and the article is sent for storage or loading for transport.
Figure 13:
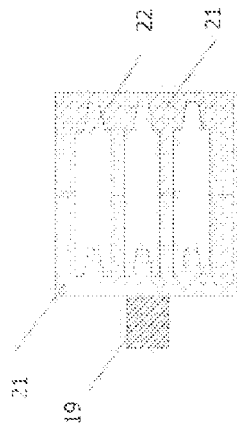
FIG. 13: is a partial schematic and illustrative view of a cross-section of a formwork consisting of two modular segments 21 suitable for vibration-assisted forming of sulphur-based articles 22.

A 400 gram sulphur sample is liquefied in a beaker at ambient pressure and heated to approx. 200° C. (473° K), producing a layer 50 mm thick. Said sample of liquid sulphur is left to cool in air at ambient temperature and subjected to elastic waves by positioning the beaker on a 135 W (50 Hz) vibrating plate. The sample is subjected to vibrations characterised by effective mean weighted acceleration of approx. 7 m/s$^2$. As the mass cools, it is progressively transformed into a suspension of solid crystallised sulphur in liquid sulphur, and the consistency and granularity of the sample gradually increase. Approximately 25 minutes after the start of the cooling and vibration process, the sample is again penetrable, and the insertion of a thermocouple into the mass indicates a mean temperature of under 115° C. (388° K). When the sample has reached the desired consistency, the vibrations are suspended. After the induction of elastic waves in the sample, the mass is left to solidify at ambient temperature until a compact mass is obtained, with a hardness of 3 Mohs, devoid of macrocrystals and macrovacuoles, characterised by a volume weight of 19.57 KN/m3, and consisting of orthorhombic alpha crystals as illustrated in the diffractogram in FIG. 1. The sample thus obtained has better mechanical characteristics than the sample in example 1.

EXAMPLE 3

A sulphur-based article having a height of 810 mm and a weight exceeding 1.4 tonnes is formed in a formwork having a base with the dimensions 1200 mm×800 mm×144 mm. Said formwork consists of 4 interlocking aluminium panels and has a height of 1000 mm. Forming is vibration-assisted through a vibrating base with the application of elastic waves with a frequency greater than or equal to 50 Hz, and takes place by means of a continuous feed under growth-level and pouring temperature control. During the forming process, grooves are produced on the outer lateral surface and the lower surface for positioning handling cables. The block is cooled by natural convection until completely solidified at an average temperature of under 90° C. The average density of the article is controlled by the ultrasonic operating device.

EXAMPLE 4

A sulphur-based article is formed in a formwork having a base with the dimensions 1016 mm×1219 mm×150 mm. The formwork consists of 4 interlocking aluminium panels and has a height of 850 mm. The sulphur is fed in the liquid state at a controlled temperature of approx. 130° C. and under flow-rate control. A floating heat exchanger vibrating at 100 Hz, driven by an electromechanical vibrodyne, is placed on the surface of the liquid sulphur, and induces in the sulphur beneath it the formation of a suspension of crystalline sulphur in molten sulphur. The molten sulphur is fed in such a way as to allow the formation of a layer of solid sulphur on the base and a layer of sulphur in suspension above it. The sulphur level and the vibrating heat exchange area are then increased to the pre-set height of 720 mm. During the forming process, grooves of suitable dimensions for positioning the forks of a forklift truck are produced on the outer lateral surface and the lower surface. When solidification is complete, a block of sulphur weighing over 1.7 tonnes is obtained. At this point the aluminium formwork is opened and the panels and floating heat exchanger are separated. The block is then moved by a fork-lift truck and loaded directly onto the transport container, or wrapped in a protective material such as polyethylene sheets before transport. In this way a unit equipped with suitable liquid sulphur loading arms, steam-traced and serving 30 molten sulphur feed zones each containing 10 articles of manufacture in the pouring/forming state, guarantees sulphur productivity exceeding 500 tonnes/day.

EXAMPLE 5

A 30 kg block of sulphur of high purity is produced using a vibrating device characterised by a metal containment and forming container (300 mm×300 mm×300 mm) and equipped with 3 different pneumatic turbine transducers (max rpm=17000, max centrifugal force of single transducer=5000 N), activated simultaneously and positioned on the outside of 3 different boundary walls of said forming container, in order to induce elastic perturbations in the liquid sulphur. The forming container is equipped with fixed and mobile thermocouples positioned in the mass of sulphur, and the walls are preferably coated with non-stick material. The 30 kg mass of sulphur is melted separately and rapidly poured at approx. 130° C. into said forming container. After pouring, the pneumatic transducers are activated to regulate the airflow pressure and the temperature and oscillation frequency of the structure monitored. The mass of molten sulphur is vigorously mixed by an induced vibrational field (frequency exceeding 20 Hz), and the cooling and crystallisation process begins. During said process, the crystallisation germs and crystalline structures formed are conveyed by the motion induced by the vibrations from said colder peripheral areas to the warmer central areas and vice versa as a result of continuous mixing, producing an increasingly concentrated suspension of solid in the molten sulphur. After 90 minutes' application from the start of said process, the mass presents as a suspension with a high concentration of dispersed solid and a mean temperature, detected by the thermocouples, of between 110° C. and 115° C. The article subjected to vibrations is left to cool in said forming container until it reaches ambient temperature, producing a block of sulphur with a high density.

EXAMPLE 6

A 30 kg block of sulphur with high purity is produced with the same vibrating device as in example 6, poured and vibrated under the same operating conditions. The suspension at high solid concentration obtained after 90 minutes' cooling and application of vibrations in said device is transferred from the first volume of containment to a second volume of containment and forming container to complete the process of crystallisation and cooling to ambient temperature.

EXAMPLE 7

A 30 kg block of sulphur with high purity is produced with the same vibrating device as in example 5, poured and vibrated under the same operating conditions. The suspension at high solid concentration obtained after 90 minutes' cooling and application of vibrations in said device is transferred from the first volume of containment to a second volume of containment and forming container to complete the process of crystallization and cooling to ambient temperature.

EXAMPLE 8

A 30 kg mass of high-purity sulphur, preferably at approx. 130° C., is poured and vibrated under the same operating conditions as in example 6, using the same vibrating device. The sulphur suspension at high concentration obtained during cooling and application of the vibrations in said device is pumped by a slurry pump heated with diathermic oil to a temperature preferably greater than 120° C. and introduced into a containment and forming volume consisting of a bag formed by a double layer of paper (of the type normally used to transport cement powder). The bag is then closed and the sulphur mass transported to a different area to complete the process of crystallisation and cooling to ambient temperature.

EXAMPLE 9

A 30 kg mass of high-purity sulphur, preferably at approx. 130° C., is poured and vibrated under the same operating conditions as in example 6, using the same vibrating device. The suspension with a high solid concentration obtained during cooling and application of vibrations in said device is used to spread an even layer of sulphur (approx. 5 mm thick) with a corrosion-proofing function on a cement surface having the dimensions 2000 mm×1500 mm

EXAMPLE 10

A molten sulphur mass is poured, preferably at approx. 130° C., and suitably vibrated during the cooling stage to obtain a strongly stirred suspension with a high solid concentration in a container. Said suspension is continuously fed with a quantity of molten sulphur, while an equal quantity of suspension is continuously taken up and spread on the surface of a high-density polystyrene panel reinforced with electrowelded metal mesh to obtain a panel of suitable dimensions covered with crystalline sulphur.

EXAMPLE 11

The molten sulphur is fed into a volume of containment, preferably at approx. 130° C., and vibrated during the cooling stage until a stirred suspension with a high concentration of solid sulphur is obtained. Said container containing the suspension is continuously fed with a quantity of molten sulphur, while an equal quantity of suspension is continuously taken up and spread on the surface of panels made of high-density polystyrene (or other material with high heat inertia) and reinforced with electrowelded stainless steel mesh to obtain insulating panels with the desired mechanical characteristics, resistant to acid attack, covered with crystalline sulphur.

EXAMPLE 12

Molten sulphur is fed into a volume of containment, preferably at approx. 130° C., and vibrated during the cooling stage until a vigorously stirred suspension with a high solid concentration is obtained. Said suspension is pumped into a formwork containing a metal grid previously filled with expanded clay until said formwork is filled, said formwork preferably being vibrated. Once the solidification and cooling process has been terminated said formwork is opened, and the article of manufacture removed. Alternatively, the molten sulphur is fed directly to the formwork containing a metal grid previously filled with expanded clay until said formwork is filled, said formwork being vibrated until the formation of a suspension of solid sulphur in liquid sulphur and complete filling of the interstitial spaces between the expanded clay particles.

EXAMPLE 13

The sulphur is fed into a volume of containment at approx. 130° C. and vibrated during the cooling stage to obtain a stirred suspension with a high concentration of solid sulphur. Said suspension is subsequently spread on a thin layer of sulphur cement; when said operation has been completed, it is covered with a further layer of sulphur cement to obtain a stratified article.

EXAMPLE 14

The sulphur is fed into a volume of containment and vibrated during the cooling stage to obtain a stirred suspension with a high concentration of solid sulphur in order to produce an article of manufacture. A filler consisting of a mixture of lampblack (70% wt.) and tyre powder (30% wt.) is added to said suspension, the quantity of said mixture preferably exceeding 10% of the total weight of the final article.

EXAMPLE 15

The sulphur is fed into a volume of containment and vibrated during the cooling stage to obtain a stirred suspension with a high concentration of solid sulphur in order to produce an article made of bentonite sulphur. A filler consisting of bentonite clay is dispersed in said suspension, the quantity of said filler preferably exceeding 10% of the total weight of the final article.

EXAMPLE 16

The sulphur is fed into a volume of containment and vibrated during the cooling stage to obtain a stirred suspension with a high concentration of solid sulphur. A cement article is immersed in said suspension to form a layer of crystalline sulphur on its surface with a protective function against acid attack.

The invention claimed is:

1. Process for the preparation of an article of manufacture made of, based on or coated with sulphur, which comprises the following steps:
   a) feeding of a mass of liquid sulphur into a volume of containment or forming container of said article of manufacture;
   b) cooling of said mass of liquid sulphur and simultaneous application of elastic waves to said mass of liquid sulphur until a mass of solid crystalline sulphur in suspension in said mass of liquid sulphur is obtained;
   c) finishing of said article of manufacture made of, based on or coated with sulphur following complete solidification of the mass of liquid sulphur.

2. Process as claimed in claim 1, wherein said elastic waves are applied to the sulphur mass with a frequency greater than 0.1 Hz and preferably greater than 50 Hz.

3. Process as claimed in claim 1, wherein said finishing is completed in at least one volume of containment or forming container other than the one used in step a) as described in claim 1.

4. Process as claimed in claim 1, wherein said finishing is effected by immersion, spreading or pouring of said mass of sulphur obtained in step b) as described in claim 1.

5. Process as claimed in claim 1, wherein said solidification is conducted in the presence of at least one heat exchanger, said exchanger being preferably equipped with an exchange surface vibrating in contact with said liquid sulphur and/or with said suspension of solid crystalline sulphur.

6. Process as claimed in claim 1, wherein the liquid sulphur is fed into said volume of containment and/or forming container at temperatures preferably equal to or lower than 130° C.

7. Process as claimed in claim 1, wherein organic and/or inorganic components are added to said mass of liquid sulphur containing said suspension of solid crystalline sulphur to modify the characteristics of said article of manufacture, wherein said additions are performed by pre-mixing said components in liquid sulphur.

8. Process as claimed in claim 1, wherein said article of manufacture contains reinforcements or materials designed to modify its heat conductivity.

9. Process as claimed in claim 1, wherein the article of manufacture is provided with cavities and/or holes and/or projections and/or grooves.

10. Process as claimed in claim 1, wherein the mean density and/or thickness of the sulphur article of manufacture is recorded during cooling and solidification of the sulphur by techniques using elastic waves, in particular ultrasound.

11. Process as claimed in claim 1, wherein said volume of containment or forming container is placed on a handling and/or transport pallet.

12. Sulphur-based article of manufacture obtainable with the process claimed in claim 1.

13. Process for the preparation of an article of manufacture made of, based on or coated with sulphur, which comprises the following steps:
   a) feeding of a mass of liquid sulphur into a volume of containment or forming container of said article of manufacture;
   b) cooling of said mass of liquid sulphur and simultaneous application of elastic waves to said mass of liquid sulphur until a mass of solid crystalline sulphur in suspension in said mass of liquid sulphur is obtained;
   c) finishing of said article of manufacture made of, based on or coated with sulphur following complete solidification of the mass of liquid sulphur, wherein said finishing is effected by immersion, spreading or pouring of said mass of sulphur.

* * * * *